(12) United States Patent
Hwang et al.

(10) Patent No.: US 12,515,185 B2
(45) Date of Patent: Jan. 6, 2026

(54) BUBBLE COLUMN REACTOR

(71) Applicant: LG Chem, Ltd., Seoul (KR)

(72) Inventors: Moon Sub Hwang, Daejeon (KR); Hong Min Lee, Daejeon (KR); Jeong Seok Lee, Daejeon (KR); Jong Hun Song, Daejeon (KR); Kyung Seog Youk, Daejeon (KR)

(73) Assignee: LG Chem, Ltd., Seoul (KR)

( * ) Notice: Subject to any disclaimer, the term of this patent is extended or adjusted under 35 U.S.C. 154(b) by 566 days.

(21) Appl. No.: 18/017,315

(22) PCT Filed: Jun. 17, 2022

(86) PCT No.: PCT/KR2022/008606
§ 371 (c)(1),
(2) Date: Jan. 20, 2023

(87) PCT Pub. No.: WO2023/106524
PCT Pub. Date: Jun. 15, 2023

(65) Prior Publication Data
US 2024/0246053 A1    Jul. 25, 2024

(30) Foreign Application Priority Data

Dec. 10, 2021  (KR) .................. 10-2021-0177022

(51) Int. Cl.
*B01J 10/00*  (2006.01)
*B01J 19/00*  (2006.01)
(Continued)

(52) U.S. Cl.
CPC ......... *B01J 10/002* (2013.01); *B01J 19/0013* (2013.01); *B01J 19/2415* (2013.01); *C08F 110/02* (2013.01); *B01J 2219/00083* (2013.01)

(58) Field of Classification Search
CPC ...... B01D 5/00; B01D 5/0078; B01D 5/0084; B01D 5/009; B01J 8/00; B01J 8/008;
(Continued)

(56) References Cited

U.S. PATENT DOCUMENTS 5,634,516 A    6/1997  Myohanen et al.
5,883,292 A    3/1999  Dassel et al.
(Continued)

FOREIGN PATENT DOCUMENTS

CN    105732332 A    7/2016
CN    205717909 U    11/2016
(Continued)

OTHER PUBLICATIONS

Search Report dated Jul. 29, 2025 from the Office Action for Chinese Application No. 202280005275.7 issued Jul. 30, 2025, pp. 1-2.
(Continued)

*Primary Examiner* — Natasha E Young
(74) *Attorney, Agent, or Firm* — Lerner David LLP

(57) ABSTRACT

A bubble column reactor includes a reaction zone in which a reaction of a gaseous reactant is carried out in a liquid reaction medium, a first disengaging section provided above the reaction zone and into which a first effluent stream rising from the reaction zone is introduced, and a condensation zone provided above the first disengaging section. The bubble column reactor's condensation zone diameter is smaller than the diameter of the first disengaging section.

11 Claims, 3 Drawing Sheets

(51) Int. Cl.
  *B01J 19/24* (2006.01)
  *C08F 110/02* (2006.01)

(58) Field of Classification Search
  CPC ..... B01J 8/067; B01J 8/22; B01J 10/00; B01J 10/002; B01J 19/00–0013; B01J 19/24; B01J 19/2415; B01J 2219/00; B01J 2219/00049; B01J 2219/00051; B01J 2219/00074; B01J 2219/00083; C07C 2/00–08; C07C 11/00–04; C07C 11/107; C08F 110/00; C08F 110/02
  See application file for complete search history.

(56) References Cited

U.S. PATENT DOCUMENTS

| | | | |
|---|---|---|---|
| 10,626,063 B2 * | 4/2020 | Azam | .................. B01J 31/128 |
| 2007/0260075 A1 | 11/2007 | Jubin et al. | |
| 2009/0272673 A1 | 11/2009 | Gaemers | |
| 2010/0216896 A1 | 8/2010 | Wang et al. | |
| 2017/0210680 A1 | 7/2017 | Azam et al. | |
| 2020/0139334 A1 | 5/2020 | Al-Dughaiter et al. | |
| 2022/0143568 A1 | 5/2022 | Lee et al. | |
| 2023/0011845 A1 | 1/2023 | Augier et al. | |

FOREIGN PATENT DOCUMENTS

| | | |
|---|---|---|
| CN | 110114132 A | 8/2019 |
| CN | 209548763 U | 10/2019 |
| CN | 110627764 A | 12/2019 |
| EP | 3909939 A1 | 11/2021 |
| JP | H07136494 A | 5/1995 |
| JP | H09276689 A | 10/1997 |
| JP | h09276689 A | 10/1997 |
| JP | 2002363204 A | 12/2002 |
| JP | 2007197636 A | 8/2007 |
| JP | 2008511638 A | 4/2008 |
| JP | 2009520094 A | 5/2009 |
| JP | 2009535212 A | 10/2009 |
| JP | 2013199614 A | 10/2013 |
| JP | 2015-199614 A | 11/2015 |
| JP | 2015189740 A | 11/2015 |
| JP | 2016188295 A | 11/2016 |
| KR | 0986750 B1 | 10/2010 |
| KR | 20110037640 A | 4/2011 |
| KR | 20130003039 A | 1/2013 |
| KR | 20150124549 A | 11/2015 |
| KR | 20170032377 A | 3/2017 |
| KR | 20190083095 A | 7/2019 |
| KR | 20210091500 A | 7/2021 |
| WO | 2006028752 A2 | 3/2006 |
| WO | 2007086610 A1 | 8/2007 |
| WO | 2015128329 A1 | 9/2015 |
| WO | 2021122140 A1 | 6/2021 |

OTHER PUBLICATIONS

International Search Report for PCT/KR2022/008606 maild Sep. 19, 2022. 4 pgs.

Extended European Search Report for Application No. 22838621.5 dated Apr. 20, 2023. 9 gs.

* cited by examiner

[FIG. 1]
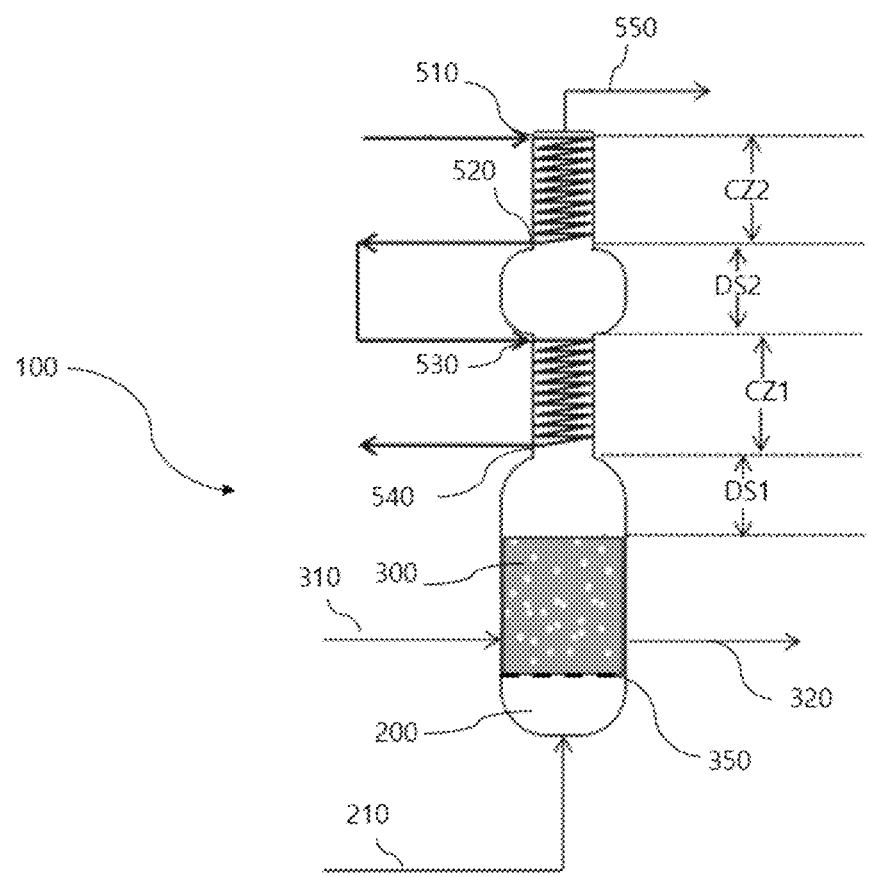

[FIG. 2]
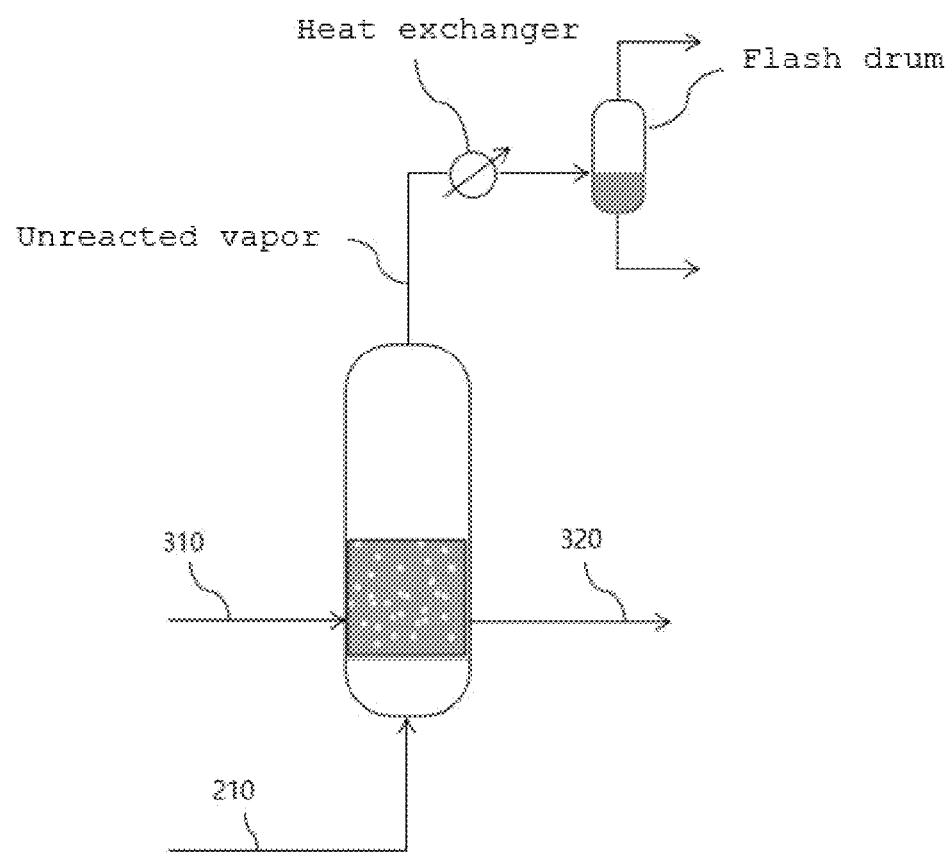

[FIG. 3]
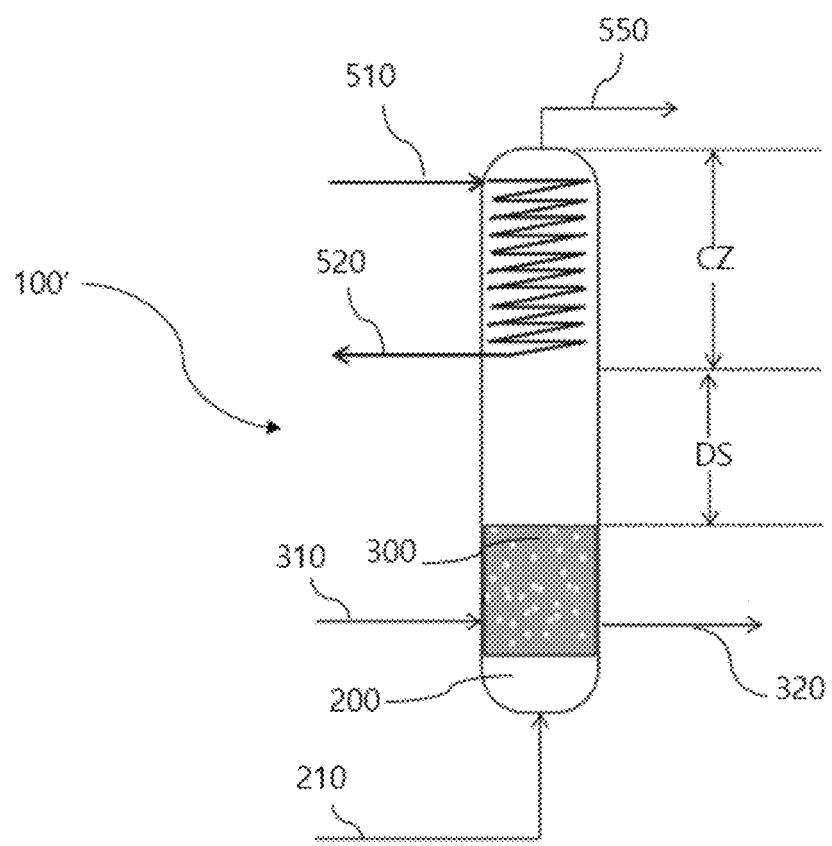

BUBBLE COLUMN REACTOR

CROSS-REFERENCE TO RELATED APPLICATION

The present application is a national phase entry under 35 U.S.C. § 371 of International Application No. PCT/KR2022/008606, now WO 2023/106524, filed on Jun. 17, 2022 which claims priority from Korean Patent Application No. 10-2021-0177022, filed on Dec. 10, 2021, all of which are incorporated herein by reference.

TECHNICAL FIELD

The present invention relates to a bubble column reactor, and more particularly, to an oligomer production apparatus for reducing the amount of entrained solids and liquids inside a reactor during oligomer production, thereby improving stabilization of an overall process.

BACKGROUND ART

Alpha-olefins are widely used commercially as important materials used in comonomers, detergents, lubricants, and plasticizers. In particular, 1-hexene and 1-octene have been widely used as comonomers for controlling the density of polyethylene in the production of linear low-density polyethylene (LLDPE).

Alpha olefins are typically prepared through oligomerization of ethylene. As a reactor type in which the ethylene oligomerization reaction is carried out, a bubble column reactor performing an oligomerization reaction of ethylene (trimerization reaction or tetramerization reaction) through contact with a reaction zone including a liquid reaction medium including a catalyst using gaseous ethylene as a reactant has been used.

In the case of a bubble column reactor, gas, which is a reactant, is mixed with a liquid reaction medium in the reaction zone to exist in two phases. As a result of a catalytic reaction, a small amount of polymer is produced as a by-product, which floats in the liquid reaction medium. At this time, entrainment of the solid polymer and the liquid reaction medium inevitably occurs due to a rate at which a large amount of gaseous reactant is introduced into the reaction zone in the form of a large amount of bubbles.

Due to such entrainment, a by-product polymer accumulates not only on an inner wall of the reactor but also on downstream process devices such as condensers, pipes, and valves, thereby causing fouling. As such, fouling occurring in the downstream process devices of the reactor causes deterioration of the devices and mechanical damage, and in the worst case scenario, it may be necessary to shut down the operation of the entire process, which resultantly increases costs incurring in a washing process, as well as reduce the production according to a reduction in the operating time.

Therefore, in order to solve the above problems, there is a need for research to reduce the amount of entrainment of solids and liquids containing polymers in the bubble column reactor.

DISCLOSURE

Technical Problem

In order to solve the problems mentioned in the background of the present invention, an object of the present invention is to provide a bubble column reactor for preventing by-products including polymer materials, other than a desired product in the reactor, from being entrained, thereby improving stabilization of an overall process.

Technical Solution

In one general aspect, a bubble column reactor includes: a reaction zone in which a reaction of a gaseous reactant is carried out in a liquid reaction medium; a first disengaging section provided above the reaction zone and into which a first effluent stream rising from the reaction zone is introduced; and a condensation zone provided above the first disengaging section, wherein a diameter of the condensation zone is smaller than a diameter of the first disengaging section.

Advantageous Effects

According to the bubble column reactor of the present invention, a condensation zone is provided above the reaction zone of the bubble column reactor, thereby preventing fouling for the condenser itself due to entrainment, compared to a case in which a separate condenser is provided outside the bubble column reactor of the related art.

Meanwhile, by forming a diameter of the condensation zone provided above the reaction zone of the bubble column reactor to be smaller than a diameter of the disengaging section, a contact area between a gaseous stream introduced into the condensation zone and the cooling coil provided in the condensation zone may be maximized, thereby improving condensation efficiency. Through this, a solvent and polymer in the gaseous stream may be effectively condensed and refluxed to the reaction zone.

Furthermore, by forming the diameter of the condensation zone to be smaller than the diameter of the disengaging section, a flow change in the disengaging section for the gaseous stream that has passed through the condensation zone may be induced, so that a distribution of the gaseous stream in the disengaging section may be uniform, and accordingly, a precipitation effect in the disengaging section may be improved.

Accordingly, the stability of the entire process may be improved by reducing the amount of entrained solids and liquids, an operation stop period of the reactor may be effectively decreased by fundamentally preventing the occurrence of fouling in the downstream process devices of the reactor, and energy cost may be reduced by preventing an efficiency degradation due to fouling of the downstream process devices.

DESCRIPTION OF DRAWINGS

FIG. 1 is a view illustrating a bubble column reactor and a related process flow according to an embodiment of the present invention.

FIGS. 2 and 3 are schematic views showing a bubble column reactor of the related art.

BEST MODE

The terms and words used in the description and claims of the present invention are not to be construed as general or dictionary meanings but are to be construed as meanings and concepts meeting the technical ideas of the present invention based on a principle that the inventors can appropriately define the concepts of terms in order to describe their own inventions in the best mode.

The term "stream" in the present invention may refer to a flow of a fluid in a process, and may also refer to a fluid flowing through a transfer line (pipe) itself. Specifically, the "stream" may refer to both the fluid flowing through the pipe connecting respective devices to each other itself and the flow of the fluid at the same time. In addition, the fluid may refer to one or more of gas or liquid.

The term "C #" in which "#" is a positive integer in the present invention refers to all hydrocarbons having # carbon atoms. Accordingly, the term "C10" refers to a hydrocarbon compound having 10 carbon atoms. In addition, the term "C #+" refers to all hydrocarbon molecules having # or more carbon atoms. Accordingly, the term "C10+" refers to a mixture of hydrocarbons having 10 or more carbon atoms.

Hereinafter, the present invention will be described in more detail with reference to FIG. 1 in order to help the understanding of the present invention.

A bubble column reactor 100 according to an embodiment of the present invention may include a reaction zone 300 in which a reaction of a gaseous reactant is performed in a liquid reaction medium, a first disengaging section DS1 provided on the reaction zone 300, and into which a first effluent stream rising from the reaction zone is introduced, and condensation zones CZ1 and CZ2 provided above the first disengaging section, wherein diameters of the condensation zones CZ1 and CZ2 may be smaller than a diameter of the first disengaging section DS1.

According to an embodiment of the present invention, the bubble column reactor 100 may be for preparing an oligomer product by performing an oligomerization reaction of a gaseous reactant including a monomer in a liquid reaction medium of a solvent and a catalyst.

More specifically, the bubble column reactor 100 may include the reaction zone 300, and through one or more reaction medium supply lines 310 connected to one side of the reaction zone 300, the reaction medium may be supplied to the reaction zone 300. Here, the reaction medium may include a catalyst, a co-catalyst, and a solvent. The catalyst, the co-catalyst, and the solvent may be supplied through separate reaction medium supply lines 310, respectively, and two or more reaction medium components may be mixed and supplied to the reaction zone 300 through the reaction medium supply line 310.

According to an embodiment of the present invention, the monomer may include an ethylene monomer. As a specific example, the gaseous reactant including the ethylene monomer may be supplied into a down chamber 200 of the bubble column reactor 100 to be described later to produce a desired alpha olefin product through an oligomerization reaction.

The solvent may include one or more selected from the group consisting of n-pentane, n-hexane, n-heptane, cyclohexane, methylcyclohexane, octane, cyclooctane, decane, dodecane, benzene, xylene, 1,3,5-trimethylbenzene, toluene, ethylbenzene, chlorobenzene, dichlorobenzene, and trichlorobenzene.

The catalyst may include a transition metal source. The transition metal source may be a compound including one or more selected from the group consisting of, for example, chromium(III) acetylacetonate, chromium(III) chloride tetrahydrofuran, chromium(III) 2-ethylhexanoate, chromium (III) tris(2,2,6,6-tetramethyl-3,5-heptanedionate), chromium (III) benzoylacetonate, chromium (III) hexafluoro-2,4-pentaindionate, chromium (III) acetate hydroxide, chromium (III) acetate, chromium(III) butyrate, chromium(III) pentanoate, chromium(III) laurate, and chromium(III) stearate.

The co-catalyst may include one or more selected from the group consisting of, for example, trimethyl aluminum, triethyl aluminum, triisopropyl aluminum, triisobutyl aluminum, ethyl aluminum sesquichloride, diethylaluminum chloride, ethyl aluminum dichloride, methylaluminoxane, modified methylaluminoxane, and borate.

Meanwhile, in the reaction zone 300 of the bubble column reactor 100, the oligomerization reaction with the monomer may be performed in a liquid reaction medium including a catalyst, a co-catalyst, and a solvent. As described above, a zone composed of a reaction medium in which an oligomerization reaction of a monomer is performed may be defined as the reaction zone 300. The oligomerization reaction may refer to a reaction in which a monomer is oligomerized. Depending on the number of monomers to be polymerized, the oligomerization reaction may be called trimerization and tetramerization, which are collectively called multimerization.

The alpha olefin is widely used commercially as an important material used in a comonomer, detergent, lubricant, plasticizer, etc. In particular, 1-hexene and 1-octene are commonly used as a comonomer for controlling the density of polyethylene in the production of linear low-density polyethylene (LLDPE). The alpha olefins such as 1-hexene and 1-octene may be prepared through, for example, trimerization or tetramerization of ethylene.

The bubble column reactor 100 may include a product discharge line 320 connected to the reaction zone 300 and provided on the other side of the reaction medium supply line, and a product including alpha olefin, which is a product of the oligomerization reaction, may be discharged through the product discharge line. That is, the product discharge stream 320 may include an oligomer product generated through an oligomerization reaction and a solvent, and the oligomer product and the solvent may be separated through an additional separation device. The separated solvent may be reused in the oligomer production process. Also, for example, when the oligomerization reaction is performed using an ethylene monomer as the monomer, the oligomer product may include 1-hexene and 1-octene. The supply of the reaction medium to the reaction zone 300 and the discharge of the product from the reaction zone 300 may be performed continuously.

Meanwhile, the gaseous reactant including the monomer for the oligomerization reaction may be supplied into the down chamber 200 located at the lower portion of the bubble column reactor 100 through a gaseous reactant supply pipe 210, and then pass through a dispersion plate 350 to be supplied to the reaction zone 300 including the liquid reaction medium.

That is, the dispersion plate 350 may be provided between the down chamber 200 and the reaction zone 300, and the gaseous reactant, e.g., the monomer, may be uniformly distributed and supplied to the reaction zone 300 including the reaction medium from the down chamber 200 through holes formed at equal intervals along the center and circumference of the dispersion plate 350.

The gaseous reactant flows into the reaction zone 300 containing the liquid reaction medium is introduced to the reaction zone 300 through the dispersion plate 350 and is dispersed at the same time, and turbulence is generated by a force of the dispersed gas, so that the liquid reaction medium and the gaseous reactant are naturally mixed. At this time, the dispersion force of the gaseous reactant flowing into the reaction zone 300 through the dispersion plate 350 may be maintained to be greater than a head pressure acting downwardly from the liquid reaction medium, so that the liquid reaction medium may remain in the reaction zone 300.

Meanwhile, as described above, the gaseous reactant supplied to the reaction zone 300 of the bubble column reactor 100 may be catalyzed in the liquid reaction medium in which a solvent and a catalyst are present, and specifically, the catalytic reaction may be an oligomerization reaction. In this case, the gaseous reactant and the reaction medium in the reaction zone 300 are mixed with each other to exist in two phases. Meanwhile, in the reaction zone 300, a small amount of polymer may be produced as a by-product as a result of the catalytic reaction of a gaseous reactant, which floats in the liquid reaction medium. At this time, entrainment of the solid polymer and the liquid reaction medium may take place due to a rate at which a large amount of gaseous reactant is introduced into the reaction zone 300 in the form of a large amount of bubbles. That is, when the unreacted gaseous reactant moves upwardly through the reaction zone 300, not only the unreacted gaseous reactant but also the polymer and solvent, which are by-products, move upwardly together. In this case, the entrained polymer is deposited in the downstream process device of the bubble column reactor 100 due to the adhesiveness of the polymer, thereby causing a fouling phenomenon that inhibits flowability of the fluid.

Accordingly, the bubble column reactor 100 according to an embodiment of the present invention may include a disengaging section DS and a condensation zone CZ provided above the reaction zone 300, so that by-products containing a polymer are prevented from being entrained, thereby preventing fouling in the downstream process device and improving the stability of the entire process.

More specifically, referring to FIG. 1, a gaseous first effluent stream from the reaction zone 300 may be introduced into a first disengaging section DS1. The first effluent stream may include non-vapors such as entrained polymers and solvents in addition to unreacted gaseous reactants. The first effluent stream may pass through the first disengaging section DS1 so that an upward movement rate thereof may be reduced and part of the non-vapor, such as entrained polymer and solvent, in particular, part of the polymer non-vapor, which is a solid material with a relatively heavy specific gravity, may preferentially be precipitated to the reaction zone 300. For example, about 10% of the vaporized solvent and non-vapor contained in the first effluent stream may be precipitated by the first disengaging section DS1.

Subsequently, the first effluent stream passing through the first disengaging section DS1 may be introduced into the condensation zone CZ. The condensation zones CZ1 and CZ2 may include a cooling coil, and a refrigerant may be supplied to the cooling coil. The first effluent stream passing through the first disengaging section DS1 may pass through the condensation zones CZ1 and CZ2 formed to have a low temperature, so that a large amount of vaporized solvent and entrained polymer may be precipitated. In particular, the vaporized solvent may be liquefied by condensation, and the liquefied solvent may be precipitated to be refluxed into the reaction zone.

Meanwhile, referring to FIG. 2 showing a bubble column reactor of the related art, the bubble column reactor sequentially includes the down chamber, the reaction zone, and the disengaging section therein, but does not include a condensation zone such as in the present invention inside the bubble column reactor. That is, the unreacted vapor discharged to the upper portion of the bubble column reactor was condensed through an external heat exchanger, and then the condensed components such as solvents and the unreacted gas reactants were separated through a separation device, for example, a flash drum. In this case, the entrained polymer component may be discharged as it is to the upper portion of the bubble column reactor and the polymer component may be deposited in the heat exchanger, the flash drum, and the pipe connecting them to cause frequent fouling.

That is, according to an embodiment of the present invention, since the condensation zones CZ1 and CZ2 are provided inside the bubble column reactor 100, the effect of quickly condensing and precipitating the mixed gas may be achieved, even without a separate facility such as a pipe, compared to the case in which a separate condenser is provided outside the bubble column reactor. Furthermore, the fouling problem in the pipe between the bubble column reactor and the external condenser due to the entrained polymer or the fouling problem in the condenser itself may be fundamentally solved.

According to an embodiment of the present invention, the condensation zones CZ1 and CZ2 may include a first condensation zone CZ1 and a second condensation zone CZ2, and a second disengaging section DS2 may be provided between the first condensation zone CZ1 and the second condensation zone CZ2. That is, the bubble column reactor 100 may sequentially include the first disengaging section DS1, the first condensation zone CZ1, the second disengaging section DS2, and the second condensation zone CZ2 above the reaction zone 300.

Specifically, the first effluent stream that has passed through the first disengaging section DS1 passes through the first condensation zone CZ1 and is introduced into the second disengaging section DS2, and the stream discharged to an upper portion of the second disengaging section DS2 may pass through the second condensation zone CZ2 as a second effluent stream. In this process, the vaporized solvent and entrained polymer in the first effluent stream rising from the reaction zone 300 may be almost entirely removed, and the gaseous effluent stream 550 containing unreacted monomer components may be discharged to an upper portion of the bubble column reactor 100.

Meanwhile, according to an embodiment of the present invention, the bubble column reactor 100 may have a cylindrical shape with a circular cross-section, and the reaction zone 300, the condensation zones CZ1 and CZ2, and the disengaging section DS1 and DS2 may also have a circular cross-section. The first and second condensation zones CZ1 and CZ2 may have the same diameter, the first and second disengaging sections DS1 and DS2 may have the same diameter, and the diameters of the first and second condensation zones CZ1 and CZ2 may be smaller than the diameters of the first and second disengaging sections DS1 and DS2. Here, the diameters of the first and second condensation zones CZ1 and CZ2 specifically refer to the diameters of the cross-sections of the first and second condensation zones CZ1 and CZ2, and the diameters of the first and second disengaging sections DS1 and DS2 specifically refer to the diameters of the cross-sections of the first and second disengaging sections DS1 and DS2.

That is, the condensation of the vaporized solvent and entrained non-vapor in the condensation zones CZ1 and CZ2 is made by a low temperature inside the condensation zones CZ1 and CZ2, and if the diameters of the condensation zones CZ1 and CZ2 are excessively large, the temperature inside the condensation zones CZ1 and CZ2 may not be uniform, and in this case, condensation may take place near the cooling coil, but relatively less condensation may take place at a point far from the cooling coil, resulting in an increase in a non-contact area (dead zone). Therefore, by making the diameters of the condensation zones CZ1 and CZ2 smaller than the diameters of the first and second disengaging sections DS1 and DS2, for example, the non-contact area of the cooling coil and the mixed gas, such as a hollow portion of a wound cooling coil, may be reduced, thereby improving the condensation efficiency and the precipitation efficiency in the condensation zones.

To this end, the diameter of the condensation zone may be 35% to 70% of the diameter of the disengaging section, and specifically, the diameters of the first and second condensation zones CZ1 and CZ2 may be 35% to 70% of the diameters of the first and second disengaging sections DS1 and DS2. When the ratio of the diameters of the first and second condensation zones CZ1 and CZ2 to the diameters of the first and second disengaging sections DS1 and DS2 is 35% or more, flow of gas rising through the first and second condensation zones CZ1 and CZ2 may be smoothly made, and when the diameter ratio is 70% or less, the non-contact area between the cooling coil and the mixed gas may be reduced to achieve a uniform temperature distribution in the condensation zone.

While the first effluent stream that has passed through the first disengaging section DS1 passes through the first condensation zone CZ1, the vaporized solvent and entrained polymer in the first effluent stream are condensed and precipitated. In particular, the vaporized solvent may be liquefied by condensation, and the liquefied solvent may be precipitated to be refluxed into the reaction zone. In this process, for example, by passing through the first condensation zone CZ1, about 40% of the vaporized solvent and non-vapor included in the first effluent stream may be precipitated.

Meanwhile, according to an embodiment of the present invention, the second disengaging section DS2 having a diameter larger than those of the first condensation zone CZ1 and the second condensation zone CZ2 may be provided between the first condensation zone CZ1 and the second condensation zone CZ2. That is, the first effluent stream passing through the first condensation zone CZ1 is introduced into the second disengaging section DS2, and due to the relatively large diameter of the second disengaging section DS2, there is a vortex in the flow of the introduced gas to cause a flow velocity and course to change. Through this, the mixed gas may be uniformly mixed in the second disengaging section DS2, and thus, the precipitation efficiency of the mixed gas may be improved. In addition, improvement in the condensation efficiency in the second condensation zone CZ2 may be achieved in that the gas flow is uniformly mixed once more in the second disengaging section DS2 before being introduced into the second condensation zone CZ2. For example, as the gas flow passes through the second disengaging section DS2, about 10% of the vaporized solvent and non-vapor contained in the first effluent stream may be further precipitated.

Furthermore, a gas flow including a portion of unreacted monomer and mixed gas from the upper portion of the second disengaging section DS2 may be discharged as the second effluent stream and introduced into the second condensation zone CZ2. In the second condensation zone CZ2, non-vapor such as vaporized solvent and polymer in the second effluent stream may be condensed and precipitated once more, and to an upper portion of the second condensation zone CZ2, unreacted monomers, e.g., a gaseous effluent stream 550 including gaseous ethylene, may be discharged to an upper portion of bubble column reactor 100. About 40% of the vaporized solvent and non-vapor contained in the first effluent stream may be further precipitated.

According to an embodiment of the present invention, the condensation zones CZ1 and CZ2 may include a cooling coil, and a refrigerant may be supplied to the cooling coil. Specifically, the cooling coil is provided in the form of a pipe through which a refrigerant may flow therein, is wound from the top to the bottom of the condensation zones CZ1 and CZ2, and a refrigerant may be introduced into inlets 510 and 530 of the cooling coil provided at the top of the condensation zones CZ1 and CZ2, and the refrigerant may be discharged through outlets 520 and 540 of the cooling coil provided at the bottom of the condensation zones CZ1 and CZ2.

Specifically, when the condensation zones CZ1 and CZ2 include the first condensation zone CZ1 and the second condensation zone CZ2, the refrigerant may be introduced into the inlet 510 of the cooling coil provided at the top of the second condensation zone CZ2 and the refrigerant may be discharged to the outlet 520 of the cooling coil provided at the bottom of the second condensation zone CZ2. Here, a temperature of the refrigerant supplied to the inlet of the cooling coil formed in the second condensation zone CZ2 may be in the range of $-10°$ C. to $-5°$ C., and a temperature of the refrigerant discharged to the outlet of the cooling coil formed in the second condensation zone CZ2 may be in the range of $-5°$ C. to $0°$ C.

The refrigerant temperature of the second condensation zone CZ2 is meaningful in that the temperature of the gaseous effluent stream 550 discharged from the bubble column reactor 100 may be controlled to a desired level according to a thermodynamic relationship.

Similarly, the refrigerant may be introduced into the inlet 530 of the cooling coil provided at the top of the first condensation zone CZ1, and the refrigerant may be discharged through the outlet 540 of the cooling coil provided at the bottom of the first condensation zone CZ1. The temperature of the refrigerant supplied to the inlet of the cooling coil formed in the first condensation zone CZ1 may be in the range of $-5°$ C. to $-0°$ C., and the temperature of the refrigerant discharged to the outlet of the cooling coil formed in the first condensation zone CZ1 may be in the range of $0°$ C. to $5°$ C.

When the condensation zones CZ1 and CZ2 include the first condensation zone CZ1 and the second condensation zone CZ2, the refrigerant required for each of the condensation zones CZ1 and CZ2 may be separately supplied to each of the inlets of the condensation zones CZ1 and CZ2, but the refrigerant supplied to the inlet 510 of the cooling coil formed in the second condensation zone CZ2 and discharged to the outlet 520 may be discharged using a refrigerant circulation pipe outside the bubble column reactor 100, re-supplied to the inlet 530 of the cooling coil formed in the first condensation zone, used for cooling the first condensation zone CZ1, and then discharged to the outlet 540 of the cooling coil of the first condensation zone CZ1. In this case, the cooling coil of the first and second condensation zones CZ1 and CZ2 and the refrigerant circulation pipe located outside the bubble column reactor 100 may be installed as one pipe, and accordingly, a flow meter for flow control, a control valve, and the like may be simplified, thus being advantageous in terms of installation cost and maintenance cost.

Meanwhile, according to an embodiment of the present invention, a height of the second condensation zone CZ2 may be 0.5 to 1 times a height of the first condensation zone CZ1. As described above, the temperature of the refrigerant supplied to the cooling coil of the second condensation zone CZ2 is lower than the temperature of the refrigerant supplied to the first condensation zone CZ1, and thus, the temperature inside the second condensation zone CZ2 is lower than the temperature of the first condensation zone CZ1. Therefore, required condensation efficiency may be achieved even when the height of the second condensation zone CZ2 is smaller than the height of the first condensation zone CZ1 in terms of non-vapor removal and condensation efficiency per unit volume, and through this, an overall height of the bubble column reactor 100 may be reduced.

According to an embodiment of the present invention, the sum of the heights of the first and second condensation zones CZ1 and CZ2 may be one to two times the height of the second disengaging section DS2. That is, the overall height of the bubble column reactor 100 may be reduced by setting the height of the second disengaging section DS2 to a level at which uniform mixing of gases is achieved by vortex generation.

Hereinabove, the bubble column reactor according to the present invention have been described and illustrated in the drawing. However, the description and the illustration of the drawing are for only essential components for understating the present invention, and processes and apparatuses not separately described and illustrated can be properly applicable and used for implementing the reactor cleaning apparatus and the reactor cleaning method, in addition to the processes and apparatuses described and illustrated in the drawing.

The invention claimed is:

1. A bubble column reactor comprising:
   a reaction zone in which a reaction of a gaseous reactant is carried out in a liquid reaction medium;
   a first disengaging section provided above the reaction zone and configured to receive a first effluent stream from the reaction zone; and
   a first condensation zone provided above the first disengaging section,
   wherein a diameter of the first condensation zone is smaller than a diameter of the first disengaging section.

2. The bubble column reactor of claim 1, wherein the diameter of the first condensation zone is between 35% and 70% of the diameter of the first disengaging section.

3. The bubble column reactor of claim 1, wherein the first condensation zone includes a cooling coil, and a refrigerant is supplied to the cooling coil.

4. The bubble column reactor of claim 1, wherein a second disengaging section is provided between the first condensation zone and a second condensation zone.

5. The bubble column reactor of claim 4, wherein the diameter of the first condensation zone and a diameter of the second condensation zone is between 35% and 70% of the diameter of the first disengaging section and a diameter of the second disengaging section, respectively.

6. The bubble column reactor of claim 4, wherein
   the first condensation zone and the second condensation zone each include a cooling coil, the cooling coils of the first and second condensation zones being configured such that
   a refrigerant supplied to an inlet of the cooling coil located in the second condensation zone is discharged from an outlet of the cooling coil in the second condensation zone, after which the refrigerant is supplied to an inlet of the cooling coil located in the first condensation zone and then discharged from an outlet of the cooling coil in the first condensation zone.

7. The bubble column reactor of claim 6, wherein
   a temperature of the refrigerant supplied to the inlet of the cooling coil formed in the second condensation zone is −10° C. to −5° C., and
   a temperature of the refrigerant supplied to the inlet of the cooling coil formed in the first condensation zone is −5° C. to 0° C.

8. The bubble column reactor of claim 4, wherein a height of the second condensation zone is 0.5 to 1 times a height of the first condensation zone.

9. The bubble column reactor of claim 4, wherein a sum of the heights of the first condensation zone and the second condensation zone is 1 to 2 times a height of the second disengaging section.

10. The bubble column reactor of claim 1, wherein the gaseous reactant includes an ethylene monomer.

11. The bubble column reactor of claim 6, which further comprises the refrigerant.

* * * * *